C. L. DELMAGE.
Fire-Extinguisher.

No. 8,841. Reissued Aug. 12, 1879.

WITNESSES.

Erwin J. France

John J. Hoffman

INVENTOR.

Christopher L. Delmage

Per Francello G. Jillson.

Attorney.

N. PETERS, PHOTO-LITHOGRAPHER, WASHINGTON, D. C.

C. L. DELMAGE.
Fire-Extinguisher.

No. 8,841. Reissued Aug. 12, 1879.

WITNESSES.

Erwin J. France

John J. Hoffman

INVENTOR.

Christopher L. Delmage

Per Francella G. Gillson

Attorney.

N. PETERS, PHOTO-LITHOGRAPHER, WASHINGTON, D. C.

UNITED STATES PATENT OFFICE.

CHRISTOPHER L. DELMAGE, OF WOONSOCKET, RHODE ISLAND.

IMPROVEMENT IN FIRE-EXTINGUISHERS.

Specification forming part of Letters Patent No. 162,041, dated April 13, 1875; Reissue No. 8,841, dated August 12, 1879; application filed June 23, 1879.

*To all whom it may concern:*

Be it known that I, CHRISTOPHER L. DELMAGE, of Woonsocket, in the county of Providence and State of Rhode Island, have invented a new and valuable Improvement in Fire-Extinguishers; and I do hereby declare that the following is a full, clear, and exact description of the construction and operation of the same, reference being had to the annexed drawings, making a part of this specification, and to the letters and figures of reference marked thereon.

Figure 1:
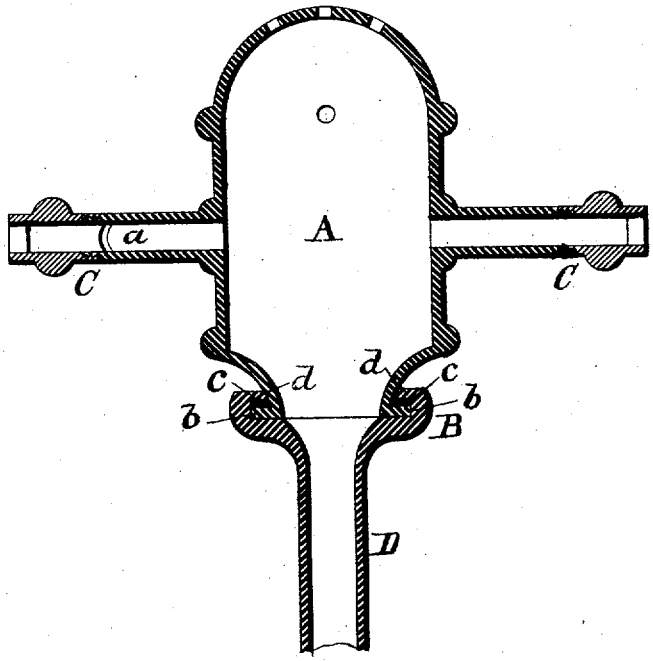
Figure 2:
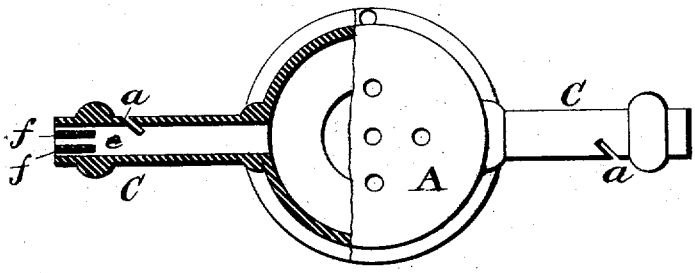
Figure 3:
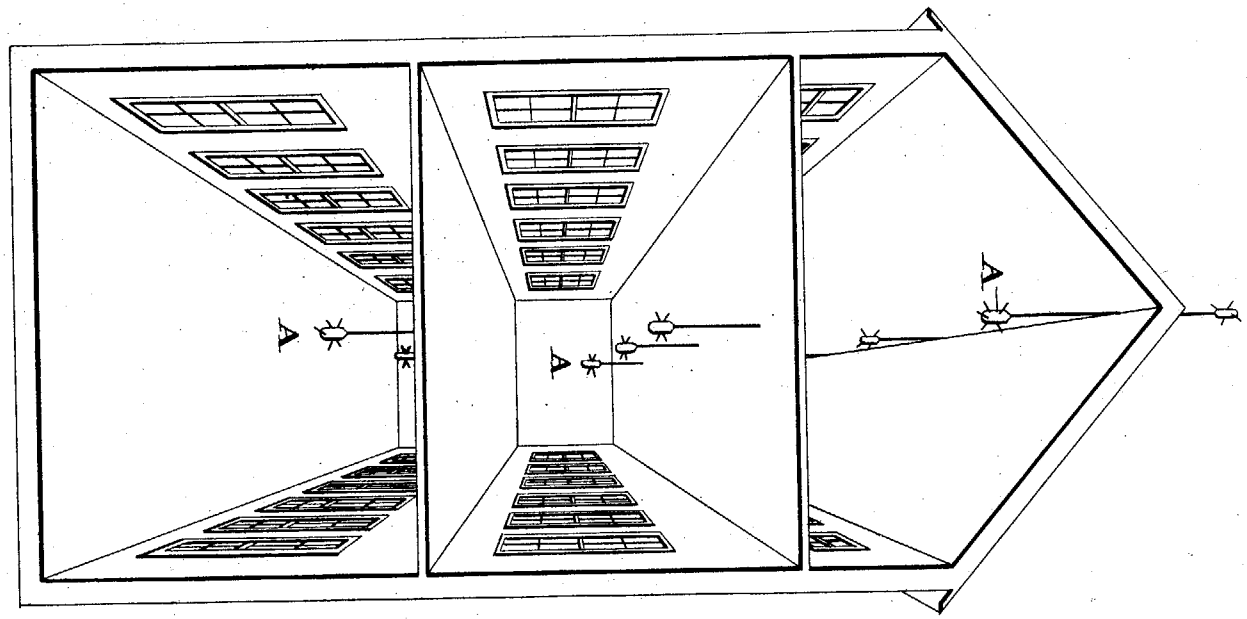

Figure 1 of the drawings is a representation of a longitudinal vertical section of my fire-extinguisher; and Fig. 2 is an end view, part sectional, of the same. Fig. 3 is a perspective view of a building, showing the position of the extinguisher.

This invention has relation to improvements in fire-extinguishers wherein are employed rotating sprinkling-heads having radial ejecting-nozzles so constructed as to throw water into and over every part of the room.

The object of the invention is to secure a positive and reliable rotation for the said head, to cause the water to be thrown out from the nozzles in fan-shaped sheets, and to secure a hermetical joint for the rotating head and its feed-pipe, upon which the former rotates.

To this end the nature of the invention consists in a transverse slit cut in the radial nozzle on opposite sides thereof, the said slits being oblique to the length of the ejecting-nozzles and inclining outward from the head, whereby the leverage of the ejecting arms or nozzles is greatly increased and a fan-shaped sheet of water is thrown.

It also consists in slots cut in the closed end of the nozzles, whereby an equal number of sheets of water is thrown during the rotation of the head into every part of the room, the sheets being separate and distinct, and yet sufficient in volume to extinguish fire wherever it falls.

In the annexed drawings, A designates a hollow head, the body of which may be cylindrical and the top hemispherical, which latter is provided with a number of perforations. The lower contracted end of head A is provided with an outwardly-projecting flange, *b*, and it is adapted to be received within a cup-shaped enlargement, B, on the upper end of a feed-pipe, D. The flanged end of head A having been inserted within cup B, a suitable packing, *c*, is laid upon flange *b*, and the lips *d* of the cup are swaged inward and over the ring, as shown in Fig. 1.

By this means the joint of the head and its feed-pipe is rendered incapable of leaking, while the free rotation of the former within the cup of the latter is in nowise obstructed.

Head A is provided with two radial arms or nozzles, C C, which are arranged diametrically opposite each other, and the outer extremities of these nozzles are divided by transverse and parallel partitions *e* into a number of exit-apertures, *f*, of flat form, through which the water will be thrown in sheets, which will be separate and distinct from each other, and yet of sufficient volume to put out the flames wherever they fall.

By this construction I secure all the advantages possessed by the sprinklers, in that the streams of water are directed to different parts of the walls, and do away with their defects, which are that the streams are concentrated and so divided up that, while the walls will be wet in spots, and the fire extinguished at those points, it will rage with undiminished violence at intermediate points.

The outer ends of nozzles C, near partitions *e*, are provided with slits *a*, which are cut in a position oblique to the long axis of the said nozzles, and on opposite sides thereof, as shown in Fig. 1, or, in other words, are secant to the circle of revolution of the head. Slits *a* being oblique to the nozzles, and at or near their outer ends, the rotation of the head will discharge a fan-shaped stream of water, and the rapidity of rotation will be greatly increased, for the reason that an increased leverage is thus imparted to the arms or nozzle, and the full head or power of the water is obtained at the ends of the said arms, and is not frittered away along their whole length. The rapid rotation of the head thus obtained insures a frequent wetting of the burning parts of a room, and does not allow time for the water to evaporate before another stream is thrown upon it.

I do not claim, broadly, a fire-extinguisher having water-discharging nozzles, which cause the rotation of the extinguisher by the effect of the unbalanced pressure of water discharged from opposite sides of the apparatus; but What I do claim as new, and desire to secure by Letters Patent, is—

1. A revolving fire-extinguisher constructed with oblique slits or discharge-orifices, substantially as hereinbefore described, whereby the water discharged therefrom under pressure for causing the apparatus to be rotated will take the form of fan-shaped sheets, for the purposes specified.

2. In a fire-extinguisher, the combination, with a rotating head, A, of the radial arms or nozzles C, having spaced partitions *e*, forming water-passages *f*, and oblique slits *a* near their ends for causing the extinguisher to be revolved, substantially as described.

In testimony whereof I have hereunto subscribed my name in the presence of two witnesses.

CHRISTOPHER L. DELMAGE.

Witnesses:
FRANCELLO G. JILLSON,
RICHARD K. RANDOLPH, Jr.